United States Patent
Park et al.

(10) Patent No.: US 10,148,797 B2
(45) Date of Patent: Dec. 4, 2018

(54) METHOD AND DEVICE FOR RECEIVING MEDIA PACKETS IN MULTIMEDIA SYSTEM

(71) Applicant: Samsung Electronics Co., Ltd., Suwon-si, Gyeonggi-do (KR)

(72) Inventors: Kyung-Mo Park, Seoul (KR); Hyeon-Cheol Pu, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 15/323,674

(22) PCT Filed: Jul. 3, 2015

(86) PCT No.: PCT/KR2015/006898
§ 371 (c)(1),
(2) Date: Jan. 3, 2017

(87) PCT Pub. No.: WO2016/003244
PCT Pub. Date: Jan. 7, 2016

(65) Prior Publication Data
US 2017/0134539 A1 May 11, 2017

(30) Foreign Application Priority Data
Jul. 4, 2014 (KR) ........................ 10-2014-0083996

(51) Int. Cl.
H04L 29/06 (2006.01)
H04N 21/236 (2011.01)
(Continued)

(52) U.S. Cl.
CPC ............ *H04L 69/22* (2013.01); *H04L 65/607* (2013.01); *H04L 65/608* (2013.01);
(Continued)

(58) Field of Classification Search
CPC . H04L 69/22; H04L 67/2804; H04L 2212/00; H04L 2463/143; H04L 29/08711;
(Continued)

(56) References Cited

U.S. PATENT DOCUMENTS

2004/0037294 A1* 2/2004 Yamaguchi ......... H04L 41/0896
370/395.42
2006/0268841 A1* 11/2006 Nagaraj ................ H04L 1/0083
370/352
(Continued)

FOREIGN PATENT DOCUMENTS

KR 10-2012-0138603 A 12/2012
KR 10-2013-0040090 A 4/2013
(Continued)

OTHER PUBLICATIONS

"AV1 Codec ISO Media File Format Binding Living Standard" (Year: 2018).*
(Continued)

Primary Examiner — Warner Wong
(74) Attorney, Agent, or Firm — Jefferson IP Law, LLP (57) ABSTRACT

The present invention relates to a method and a device for efficiently receiving particular media packets in a multimedia system. The method for receiving media packets in a multimedia system, in which media data are packetized into multiple media packets and then transmitted, according to one embodiment of the present invention comprises the steps of: determining if received media packets comprise access information for receiving particular media data and/or particular information; and if the received media packets comprise the access information, using the access information so as to preferentially receive the particular media data and/or the particular information.

16 Claims, 9 Drawing Sheets

(51) Int. Cl.
*H04N 21/434* (2011.01)
*H04L 29/08* (2006.01)
*H04N 21/643* (2011.01)
*H04N 21/845* (2011.01)
*H04N 21/854* (2011.01)

(52) U.S. Cl.
CPC ....... *H04L 67/2804* (2013.01); *H04N 21/236* (2013.01); *H04N 21/434* (2013.01); *H04N 21/64322* (2013.01); *H04N 21/8456* (2013.01); *H04N 21/85406* (2013.01); *H04L 2212/00* (2013.01)

(58) Field of Classification Search
CPC ......... H04L 47/31; H04L 47/24; H04L 47/22; H04L 47/2404
See application file for complete search history.

(56) References Cited

U.S. PATENT DOCUMENTS

| | | | | |
|---|---|---|---|---|
| 2008/0144496 | A1* | 6/2008 | Bachmutsky | H04L 47/10 370/230.1 |
| 2008/0159135 | A1* | 7/2008 | Caram | H04L 47/10 370/230 |
| 2008/0235401 | A1* | 9/2008 | Lam | H04L 65/601 709/246 |
| 2009/0003389 | A1* | 1/2009 | Joung | H04L 12/56 370/509 |
| 2009/0097559 | A1* | 4/2009 | Yang | H04N 19/51 375/240.15 |
| 2010/0208587 | A1* | 8/2010 | Landry | H04L 47/10 370/230.1 |
| 2011/0064249 | A1* | 3/2011 | Jang | G11B 27/034 381/119 |
| 2013/0094518 | A1* | 4/2013 | Bae | H04L 65/607 370/474 |
| 2013/0094545 | A1 | 4/2013 | Park et al. | |
| 2014/0086308 | A1 | 3/2014 | Li et al. | |
| 2014/0108620 | A1 | 4/2014 | Park et al. | |
| 2014/0282799 | A1* | 9/2014 | Bae | H04N 21/236 725/116 |
| 2014/0317664 | A1* | 10/2014 | Park | H04N 21/23614 725/109 |
| 2014/0328170 | A1* | 11/2014 | Racz | H04W 28/10 370/230 |
| 2014/0375894 | A1* | 12/2014 | Kellerman | H04N 21/4347 348/731 |
| 2015/0010020 | A1* | 1/2015 | Aoki | H04N 19/70 370/474 |
| 2015/0032845 | A1* | 1/2015 | Bouazizi | H04L 67/06 709/217 |
| 2015/0146797 | A1* | 5/2015 | Lee | H04N 21/2387 375/240.25 |
| 2015/0237377 | A1* | 8/2015 | Hendry | H04N 19/70 375/240.25 |
| 2015/0245063 | A1* | 8/2015 | Rusanovskyy | H04N 19/597 375/240.12 |
| 2015/0281724 | A1* | 10/2015 | Li | H04N 5/76 375/240.26 |
| 2015/0373380 | A1* | 12/2015 | Tsukagoshi | H04N 21/2362 725/109 |
| 2016/0088321 | A1* | 3/2016 | Tsukagoshi | H04N 21/2387 725/25 |
| 2016/0112731 | A1* | 4/2016 | Tsukagoshi | H04N 21/236 725/109 |
| 2016/0330176 | A1* | 11/2016 | Salo | H04L 63/0428 |
| 2017/0026458 | A1* | 1/2017 | Kitazato | H04H 20/28 |

FOREIGN PATENT DOCUMENTS

| | | |
|---|---|---|
| KR | 10-2013-0040148 A | 4/2013 |
| KR | 10-2014-0008237 A | 1/2014 |
| KR | 10-2014-0051493 A | 5/2014 |

OTHER PUBLICATIONS

ISO BMFF Byte Stream Format_Oct. 4, 2016 (Year: 2016).*
ISO BMFF Byte Stream Format_Aug. 10, 2016 (Year: 2016).*
ISO BMFF Byte Stream Format_Jul. 17, 2014 (Year: 2016).*
3GPP TR 26.949 v13.0.0, Release 13, (Dec. 2015) (Year: 2015).*
Av1-isobnnff—RAP forum discussion 1 (Year: 2016).*
MISB (Motions Imagery Standards Board) EG 0802 (Year: 2009).*
Av1-isobnnff—RAP forum discussion 2 (Year: 2016).*

* cited by examiner

METHOD AND DEVICE FOR RECEIVING MEDIA PACKETS IN MULTIMEDIA SYSTEM

CROSS-REFERENCE TO RELATED APPLICATION(S)

This application is a U.S. National Stage application under 35 U.S.C. § 371 of an International application filed on Jul. 3, 2015 and assigned application number PCT/KR2015/006898, which claimed the benefit of a Korean patent application filed on Jul. 4, 2014 in the Korean Intellectual Property Office and assigned Serial number 10-2014-0083996, the entire disclosure of which is hereby incorporated by reference.

TECHNICAL FIELD

The present disclosure relates to a method and apparatus for receiving a media packet in a multimedia system that packetizes media data into multiple media packets and transmits the multiple media packets.

BACKGROUND ART

In a recent multimedia service, a hybrid network that connects a broadcast network and a communication network at the same time and a Moving Picture Experts Group (MPEG) media transport (MMT) technology for providing hybrid contents where multimedia data, applications, and files are provided together have been considered.

Figure 1:
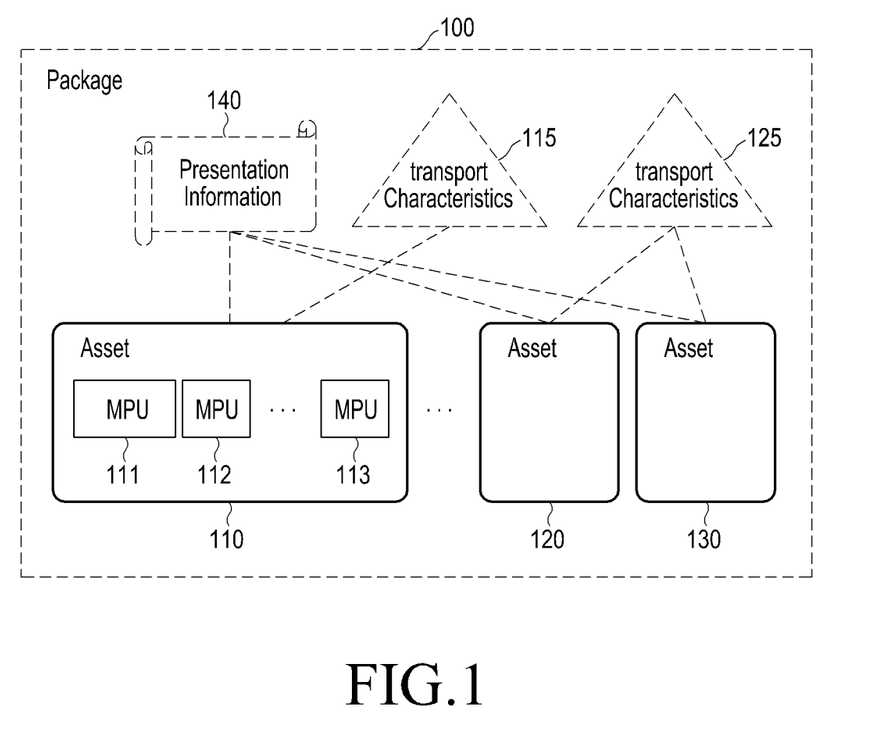
FIG. 1 is a view for describing an MMT data model in a multimedia communication system.

FIG. 1 is a view for describing an MMT data model in a multimedia communication system.

Referring to FIG. 1, the MMT technology defines a set of encoded media data and metadata related to the media data is defined as a package 100. The package 100 may include at least one MMT assets 110, 120, and 130, at least one "asset delivery characteristics (ADC) (or "transport characteristics" information) 115 and 125, and at least one presentation information (PI) 140. The package 100 may be understood as contents such as a movie, etc.

The MMT asset means multimedia data that may be used to generate multimedia presentation such as video, audio, texts, files, etc. The respective MMT assets 110, 120, and 130 may be divided into at least one media processing unit (MPU). In FIG. 1, the MMT asset #1 110 is illustrated as being divided into a plurality of MPUs 111, 112, ..., 113. The MPU is a unit in which an MMT stream is processed independently. The MPU is a unit of media data that may be decoded independently. One MPU may be divided into a plurality of pieces, each of which is referred to as an "MPU fragment unit". An MMT transmission entity divides and processes media data MPU-by-MPU, and an MMT reception entity receives media data and processes the media data for reproduction MPU-by-MPU. The ADC may include information for providing a transport characteristic of an MMT asset for each MMT asset. In the example of FIG. 1, the ADC 115 indicates transport characteristics of the asset #1 110, and the ADC 125 indicates transport characteristics of the assets #2 120 and #3 130. The PI 140 may include information describing time and space relationships among the plurality of assets 110, 120, and 130, and specifies a transmission order of MMT assets in a package.

In the multimedia system to which the MMT data model is applied, a transmitting or sending entity packetizes media data formed in MPU units into multiple MMTP packets and transmits the MMTP packets. In the multimedia system, a receiving entity depacketizes received multiple MMTP packets into MPU units and reproduces reconstructed media data.

The MPU is transmitted after being packetized into multiple MMTP packets, and the MFU is transmitted through an MMTP payload of at least one MMTP packet. The MMTP packet refers to a formatted unit of media data to be transmitted using the MMTP and carries an MMTP payload. The MMTP payload means a formatted unit of media data for transmitting a package and/or signaling messages by using the MMTP or an Internet application transport layer protocol (e.g., a real time protocol (RTP)). The MMTP payload may include MPU metadata, fragment metadata, MFU, or signaling information. The MPU metadata may include information for identifying the MPU, information for decoding media data, and so forth. The signaling information may include various signaling messages for delivery and consumption of the package. Through the signaling messages, a structure of the package, a protocol configuration, a structure of the MMTP payload, and so forth may be provided to the receiving entity.

As such, in the MMT-based multimedia system, the media data is transmitted after being divided into multiple MMTP packets (that is, transmitted as a packetized media stream), and for example, the MPU metadata and the signaling information, out of information transmitted through the multiple MMTP packet, may be considered as essential information needed for the receiving entity to decode or reproduce the media data. Therefore, for reproduction of the media stream without a delay, quick reception of the MPU metadata associated with the media data and the signaling information is needed.

DETAILED DESCRIPTION OF THE INVENTION

Technical Problem

The present disclosure provides a method and apparatus for efficiently receiving a media packet in a multimedia system.

The present disclosure also provides a method and apparatus for preferentially detecting and receiving a media packet including particular media data or particular information in a multimedia system.

Technical Solution

According to an embodiment of the present disclosure, a method for receiving a media packet in a multimedia system includes determining whether a received media packet includes access information for receiving at least one of particular media data and particular information and preferentially receiving at least one of the particular media data and the particular information by using the access information, if the received media packet includes the access information.

According to an embodiment of the present disclosure, a receiving entity for receiving a media packet in a multimedia system includes a transceiver configured to transmit and receive data through a wireless network, a decoding unit configured to decode the received data, and a controller configured to determine whether a media packet received by the transceiver includes access information for receiving at least one of particular media data and particular information and to preferentially receive the at least one of the particular media data and the particular information by using the access information if determining that the received media packet includes the access information.

MODE FOR CARRYING OUT THE INVENTION

In the following description of the present disclosure, a detailed description of well-known functions or elements associated with the present disclosure will be omitted if it unnecessarily obscures the subject matter of the present disclosure. Hereinafter, embodiments will be described with reference to the accompanying drawings.

The following embodiments will be separately described for convenience, but at least two embodiments may be implemented in combination without colliding with each other.

Moreover, a detailed description of well-known functions or elements associated with embodiments of the present disclosure will be omitted if it unnecessarily obscures the subject matter of the present disclosure. The following embodiments will be separately described for convenience, but at least two embodiments may be implemented in combination without colliding with each other.

Various changes may be made to the present disclosure and the present disclosure may have various embodiments which will be described in detail with reference to the drawings. However, the embodiments according to the concept of the present disclosure are not construed as limited to specified disclosures, and include all changes, equivalents, or substitutes that do not depart from the spirit and technical scope of the present disclosure. The terms used in the various exemplary embodiments of the present disclosure are for the purpose of describing particular exemplary embodiments only and are not intended to be limiting. The singular forms are intended to include the plural forms as well, unless the context clearly indicates otherwise. The term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

According to an embodiment of the present disclosure, a multimedia system refers to a multimedia system based on a Moving Picture Experts Group (MPEG) media transport (MMT) protocol (MMTP), as an example, and an embodiment of the present disclosure may be applied to not only an MMT-based multimedia system, but also various multimedia systems providing the same service or similar services.

The MMTP is an application layer transport protocol for packetizing and transmitting the MMT package, and is designed to efficiently and reliably transmit the package. The MMTP has improved features such as media multiplexing and network jitter calculation. These features allow efficient transmission of contents configured with media data encoded as various types. The MMTP may operate on an existing network protocol, for example, an upper layer of an UDP or the IP and may support various applications.

Figure 2:
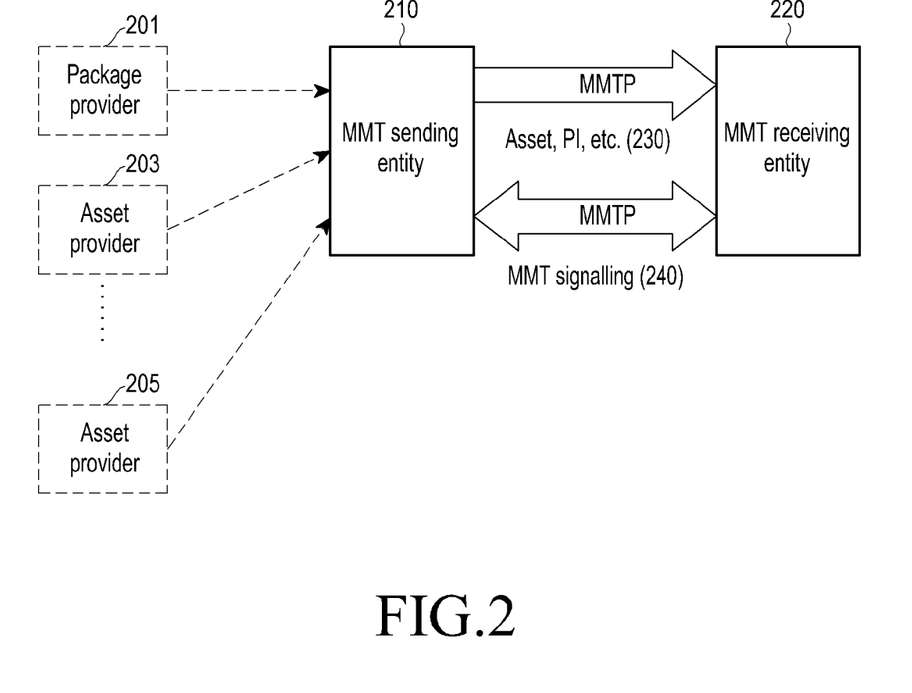
FIG. 2 illustrates a structure of a multimedia system where a sending entity and a receiving entity transmit and receive an MMTP packet according to an embodiment of the present disclosure.

FIG. 2 illustrates a structure of a multimedia system where a sending entity and a receiving entity transmit and receive an MMTP packet according to an embodiment of the present disclosure.

Referring to FIG. 2, an MMT sending entity (hereinafter, referred to as a "sending entity") 210 transmits a package including media data, as MMTP packet flows, to an MMT receiving entity (hereinafter, referred to as a "receiving entity") 220. The package may be understood as, for example, contents such as a movie, an episode of a drama, or the like. The sending entity 210 may be an arbitrary entity that transmits media data, for example, an MMT broadcast server. The reception entity 220 may be an arbitrary entity that receives media data, for example, a wireless terminal or a mobile terminal (hereinafter, referred to as a "user equipment (UE)") that is an MMT client. If the sending entity 210 is an MMT broadcast server, media data transmitted from the MMT broadcast server may be transmitted to the UE via a base station or an access point (AP) of a wireless communication system to which the UE connects.

In FIG. 2, the sending entity 210 collects contents from asset providers 203 and 205 based on PI of a package provided by a package provider 201. Herein, the package provider 201 and the asset providers 203 and 205 may be configured as separate entities or a combined entity. The sending entity 210 transmits a package including assets, control information, PI, etc., by using an MMTP in operation 230. The sending entity 210 and the receiving entity 220 transmit and receive signaling information described in the background art by using the MMTP in operation 240.

The sending entity 210 divides media data into multiple MMTP packets and transmits the MMTP packets, through some of which the MPU metadata and the signaling information are transmitted. The MMTP packets may be referred to as media packets because of carrying the media data.

Figure 3:
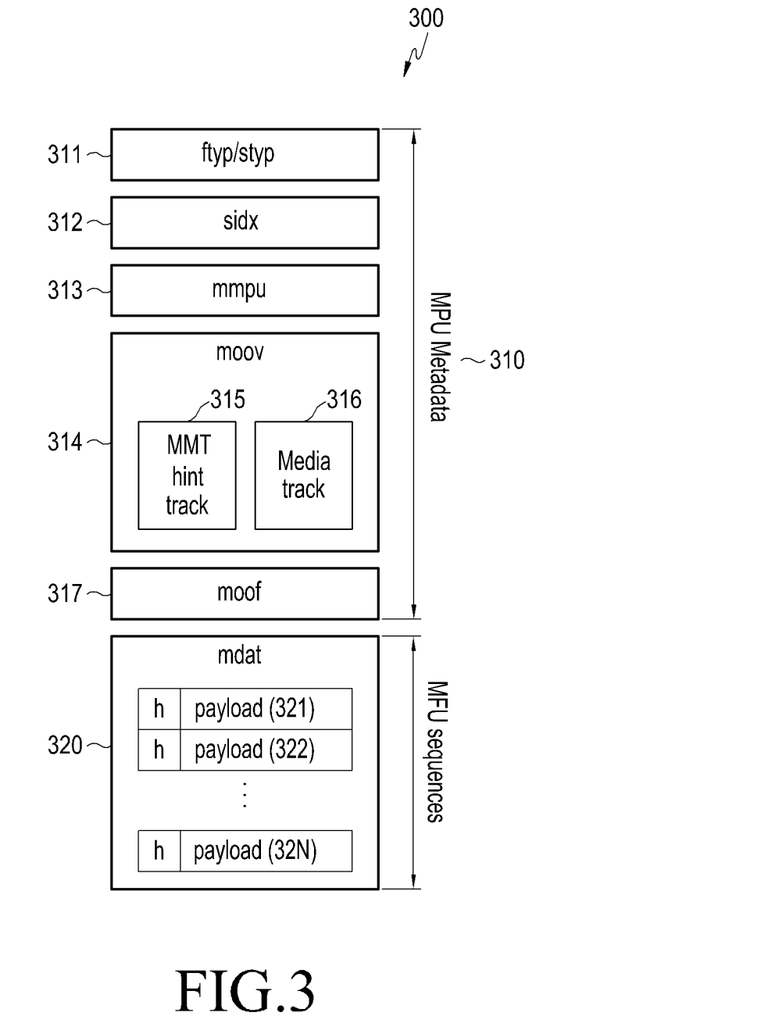
FIG. 3 illustrates a structure of an MPU based on an International Standardization Organization base media file format (ISOBMFF) including MPU metadata in a multimedia system according to an embodiment of the present disclosure.

FIG. 3 illustrates a structure of an MPU based on an International Standardization Organization base media file format (ISOBMFF) including MPU metadata in a multimedia system according to an embodiment of the present disclosure.

In an MMT-based multimedia system (hereinafter, referred to as an MMT system), both timed data having time information for decoding, such as a streaming service, and non-timed data having no time information for the decoding, such as a general file transmission service, may be supported, and FIG. 3 shows an MPU structure of timed data for convenience. The MPU structure (not shown) of the non-timed data also includes the MPU metadata.

In the MMT system, the MPU may be encapsulated according to the ISOBMFF. Referring to FIG. 3, an ISO-based media file 300 in which the MPU is encapsulated may include an MPU file 310 including the MPU metadata and an mdat box 320 in which MPU media data is included after being divided into at least one MFUs (e.g., 321, 322, . . . , 32N). Each of the MFUs 321, 322, . . . , 32N may include an MFU payload and an MFU header h. The MPU metadata may include at least one of a fytp box 311, a sidx box 312, an mmpu box 313, a moov box 314, and an moof box 317. The fytp box 311 may include type information of media data, and the sidx box 312 may include index information of fragments of an MPU. The mmpu box 313 may include an identifier of an asset to which a current MPU belongs and other information about the current MPU. The mmpu box 313 may include information ("is complete") indicating whether the current MPU includes all MFUs.

The moov box 314 may include any codec configuration information for decoding and presentation of media data. The moov box 314 may include at least one media track 316 and an MMT hint track 317 for MFUs. The MMT hint track 317 may include information necessary for converting the media file 300 including the MPU into a media stream packetized using a transport protocol such as the MMTP. That is, the MMT hint track 317 may include information necessary for generating a plurality of MFUs forming one MPU.

The MPU metadata may be considered as essential information for decoding or reproduction of the media data included in the MPU, and the receiving entity needs to preferentially detect and receive an MMTP packet including the MPU metadata from among the multiple MMTP packets which are transmitted after dividing and packetizing the MPU.

Figure 4:
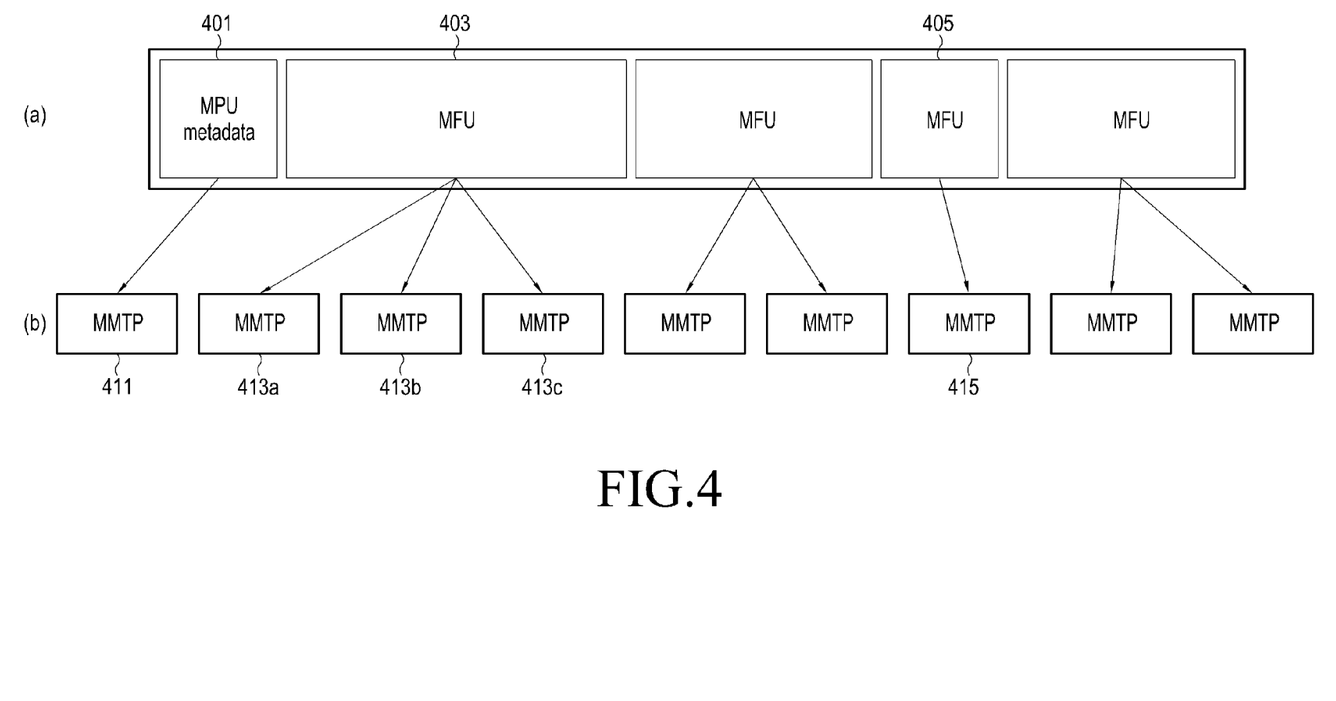
FIG. 4 illustrates an example in which an MPU is divided into multiple MMTP packets for transmission in a multimedia system according to an embodiment of the present disclosure.

FIG. 4 illustrates an example in which an MPU is divided into multiple MMTP packets for transmission in a multimedia system according to an embodiment of the present disclosure.

(a) of FIG. 4 shows an MPU including MPU metadata 401 and multiple MFUs 403, 405, . . . , and (b) of FIG. 4 shows an example where the MPU metadata 401 and the multiple MFUs 403, 405, . . . are transmitted after being packetized into multiple MMTP packets. The MPU metadata 401 is transmitted through an MMTP packet 411, and one MFU is transmitted through one MMTP packet or a plurality of MMTP packets. In FIG. 4, an MFU 406 is transmitted after being divided into three MMTP packets 413a, 413b, and 413c, and an MFU 405 is transmitted as one MMTP packet 415. The MPU metadata 401 is transmitted through one MMTP packet or a plurality of MMTP packets.

In an embodiment of the present disclosure, if an MMTP packet 411 includes data (or information) that has to be preferentially received in a payload thereof or location information for an access to the data (or the information) that has to be preferentially received in the payload thereof, the MMTP packet 411 may include random access point (RAP) information. That is, the RAP information indicates in the payload of the MMTP packet, a location of preferential data (or information) in a media stream at which the receiving entity has to start a media data access. The preferential data (or information) may be the MPU metadata, the signaling information, or an intra-coded (I) frame of an image frame. In an embodiment of the present disclosure, if detecting an MMTP packet including the RAP information from among MMTP packets, a receiving entity preferentially buffers that MMTP packet, completes data reception in MPU units, and performs signal processing with respect to the received data.

Figure 5:
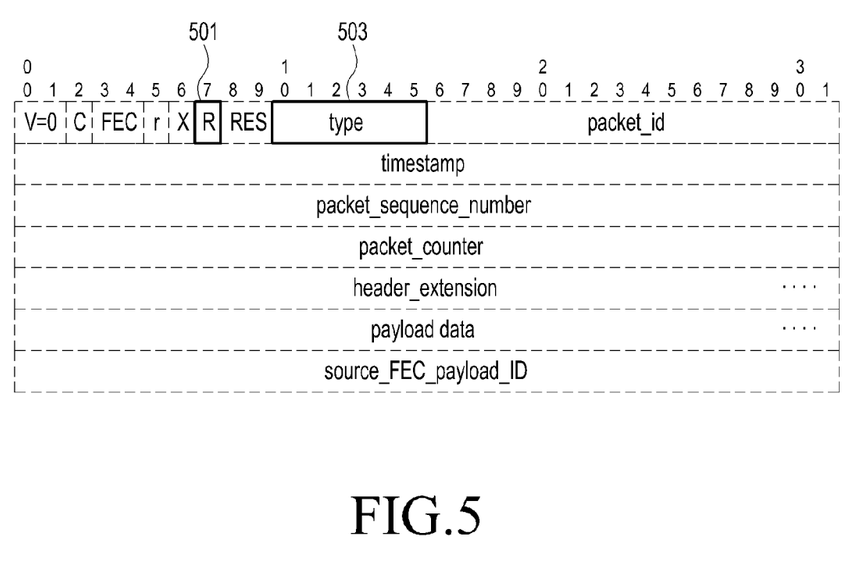
FIG. 5 illustrates a structure of an MMTP packet indicating whether RAP information is included in a multimedia system according to an embodiment of the present disclosure.

FIG. 5 illustrates a structure of an MMTP packet indicating whether RAP information is included in a multimedia system according to an embodiment of the present disclosure.

Referring to FIG. 5, a "V" field indicates a version of an MMTP protocol, and a "C" field indicates whether a packet counter (packet_counter) field exists. An "FEC" field indicates a type of a forward error correction (FEC) scheme used to prevent an error of an MMTP packet. An "r" field and an "RES" field are reserved for future use, and an "X" field indicates whether a header extension (header_extension) field exists.

The "R" field 501 is RAP flag information indicating whether payload data of an MMTP packet (hereinafter, referred to as a payload) includes the RAP information. For example, if the "R" field is "1", the payload of the MMTP packet may include the RAP information, and if the "R" field is "0", the payload of the MMTP packet may not include the RAP information. The RAP information indicates a start position for a data access to the MPU metadata, the signaling information, or the I frame of the image frame. This may be applied to both timed media data and non-timed media data.

The types of the image frame may include an I frame, a P frame, and a bidirectional-coded (B) frame. The I frame may be located in any position of a data stream, may be used for a random access to data, and may be encoded/decoded without referring to other image frames. The P frame uses previous I frame information and previous P frame information when being encoded/decoded. The P frame is a frame in which a difference between a previous scene and a current scene is encoded based on a small difference therebetween. The B frame uses both previous and next I frames and P frames when being encoded/decoded. The B frame has a difference between a previous I frame or P frame and a next I frame or P frame following the B frame. A group of consecutive image frames starting from the I frame is referred to as a group of pictures (GoP), and for reproduction of video, etc., decoding for the reproduction may start only after the I frame is received.

Thus, in the current embodiment, when a receiving entity receives a media stream and reproduces video, etc., whether RAP information is included or not is determined from the "R" field of the received MMTP packet; if the RAP information is included in the payload of the MMTP packet, the I frame may be preferentially received from the MMTP packet by using the RAP information. In another embodiment, position information regarding multiple I frames may be carried in an MMTP packet, and the position information may be received through the RAP information in the MMTP packet including the position information. In this case, the receiving entity may perform reproduction, scan, or channel switch for video, etc., rapidly without a delay by receiving multiple I frames in advance using the position information.

In this way, when the I frame is preferentially received using the RAP information, for example, in case of channel switch in a broadcast receiving environment, a reproduction delay may be minimized. Moreover, operations such as multiple speed reproduction, rewind, scan, etc., may be rapidly performed without a delay.

As such, in the current embodiment, the RAP information may be used to indicate a position of an access to particular media data (e.g., the I frame) (or particular information (e.g., MPU metadata or signaling information)) for preferential reception of the media data or the information. The particular media data (or particular information) may be included in at least one MMTP packet including the RAP information or in at least one MMTP packet located at a position indicated by the RAP information.

Referring back to FIG. 5, a "type" field 503 indicates a type of payload data of an MMTP packet. For example, if the "type" field has a value of "0x00" or "0x01", the type of the payload data means media data. The value "0x00" indicates that the payload data includes a fragment of an MPU, and the value "0x01" indicates that the payload data includes complete data of one MPU. Thus, if the "R" field has a value of "1" and the "type" field has a value of "0x00" or "0x01", the payload data may be determined to include, for example, the I frame. If the "type" field has a value of "0x02", it indicates that the payload data includes the signaling information in the particular information. In case of an MPU mode where the "type" field has a value of "0x00", it means that MPU metadata has an MPU fragment type of "0".

In an MMT system, as to the signaling information, the signaling information may be understood as control information for managing delivery and consumption of media data, for example, as various signaling messages. The signaling messages that manage consumption of the media data may be used to signal a structure of a package, and the signaling messages that manage transmission of the media data may be used to signal a payload format and a protocol configuration. The signaling messages may be configured in the form of multiple tables for efficient transmission and reception of signaling information.

An example of the signaling messages that manage consumption of the media data is as shown in Table 1, and the signaling messages for managing transmission of the media data may be, for example, receiver buffer model messages for configuring a receiver buffer model operation.

ce_number" field is used to distinguish MMTP packets having an identical "packet_id", and a "packet_counter" field is used to count the number of MMTP packets transmitted. A "header_extension" field includes user-defined information, and a "payload dat" A field includes a payload of an MMTP packet. The payload may include media data, particular information (e.g., MPU metadata or signaling information), and so forth as described above. A "source_FEC_payload_ID" indicates an FEC type such as an application level_forward error correction (AL_FEC).

The receiving entity may determine from the payload header included in the "payload dat" A field, whether MPU metadata is included in a payload of an MMTP packet. That is, through an MMTP packet, MPU metadata as well as media data may be transmitted. The payload of the MMTP packet includes the payload header and the payload data, and the payload header includes file type (FT) information. If the payload data included in the payload is the MPU metadata, the FT information has, for example, a value of "0".

Thus, if the "R" field has a value of "1" and the FT information included in the payload header in the "payload dat" A field in FIG. 5, the payload data may be determined to include the MPU metadata in the particular information. In the MMTP packet structure shown in FIG. 5, the other fields except for the "payload dat" A field form header information of the MMTP packet.

Hereinbelow, a description will be made of an operation of the receiving entity in which at least one MMTP packet including particular media data (e.g., an I frame) or particular information (E.G., MPU metadata or signaling information) is preferentially detected and received from among multiple MMTP packets transmitted after an MPU is divided and packetized in an MMT-based multimedia system according to an embodiment of the present disclosure.

Figure 6:
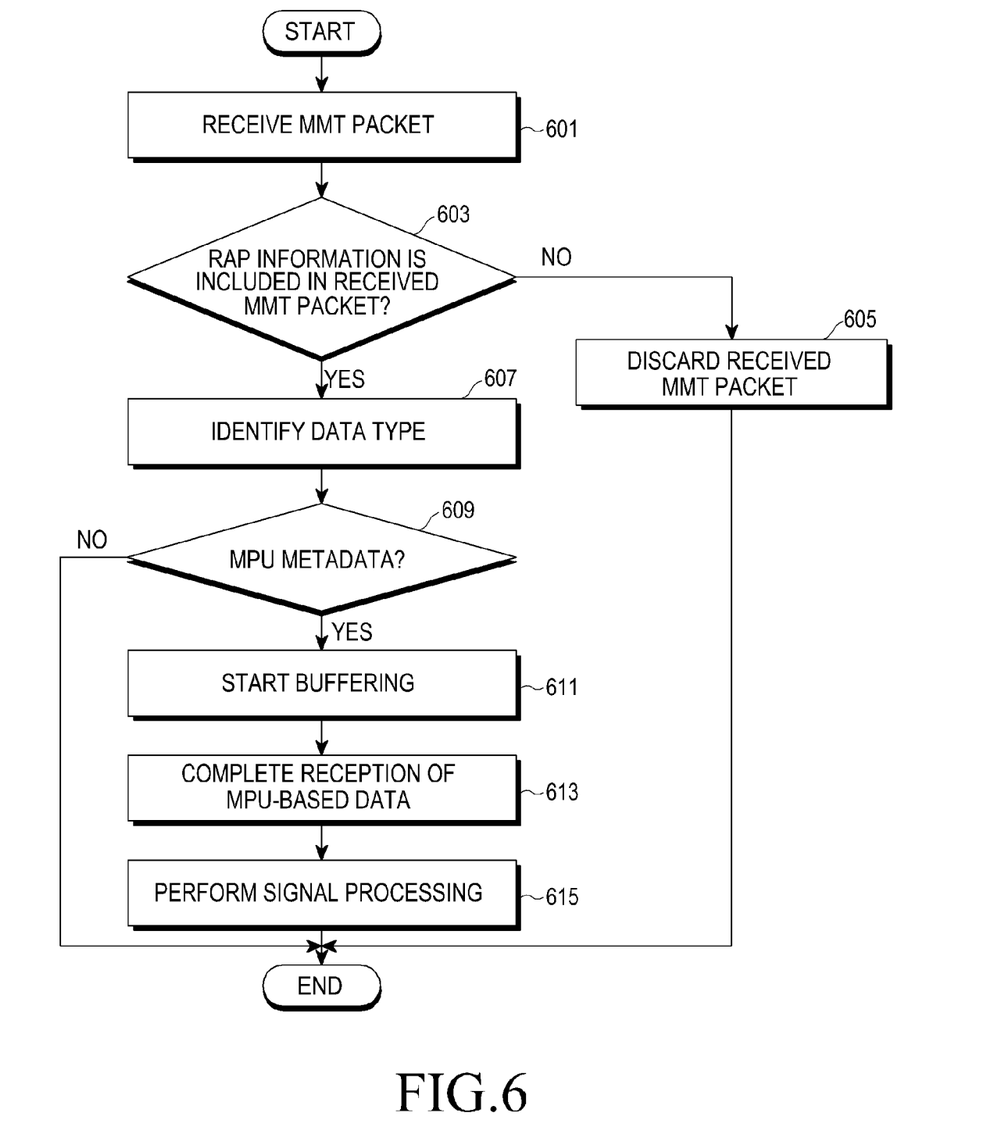
FIG. 6 is a flowchart illustrating an operation of receiving an MMTP packet including MPU metadata by a receiving entity according to an embodiment of the present disclosure.

FIG. 6 is a flowchart illustrating an operation of receiving an MMTP packet including MPU metadata by a receiving entity according to an embodiment of the present disclosure. The MPU metadata may include at least one of the fytp box

TABLE 1

| Message Type | Contents |
| --- | --- |
| Package Access (PA) message | Include information about signaling tables required for package access<br>For example, a PA message includes at least one of position information of a package, asset information of the package, a message providing detailed information of the asset, and position information for an MMT package table. |
| Media Presentation Information (MPI) message | Include an MPI table that encapsulates the entire presentation information document or a subset thereof<br>Include an MMT package (MP) table corresponding to an MPI table for rapid package consumption |
| MMT Package Table (MPT) Message | Include an MP table that provides the entire information required for consumption of one package or a part thereof |
| Clock Relation Information (CRI) message | Include clock relation information required for mapping between a timestamp and a system time clock |
| Device Capability Information (DCI) message | Include device capability information required for package consumption |

Thus, if the "R" field has a value of "1" and the "type" field has a value of "0x02", the payload data may be determined to include the signaling information (or a signaling message) from the particular information.

In FIG. 5, a "packet_id" field is used to distinguish an asset from other assets, and a "timestamp" field indicates a transmission time of an MMTP packet. A "packet_sequen- 311, the sidx box 312, the mmpu box 313, the moov box 314, and the moof box 317 described with reference to FIG. 3.

Referring to FIG. 6, once receiving an MMTP packet in operation 601, the receiving entity identifies the "R" field (i.e., RAP flag information) of FIG. 5 from header information of the received MMTP packet and determines whether the RAP information is included in the received MMTP packet in operation 603. If determining that the RAP information is not included in the MMTP packet in operation 603, the receiving entity discards the received MMTP packet in operation 605. Although the MMTP packet that does not include the RAP information is described as being discarded in operation 605, the receiving entity may perform a general operation of receiving an MMTP packet that does not include the RAP information after completing reception of MPU metadata, etc. In another embodiment, when the receiving entity uses a limited memory or performs a low-energy process, all MMTP packets that do not include RAP information may be discarded in operation 605.

If determining that the RAP information is included in the MMTP packet in operation 603, the receiving entity identifies a data type included in a payload of the MMTP packet. That is, the receiving entity identifies file type (FT) information included in a payload header of the MMTP packet to identify the data type. If the FT information indicates MPU metadata (e.g., if the FT information has a value of "0") in operation 609, the receiving entity starts buffering from the received MMTP packet in operation 611 and completes MPU-based data reception in operation 613. The receiving entity performs signal (or data) processing by using the completely received MPU metadata in operation 615.

Figure 7:
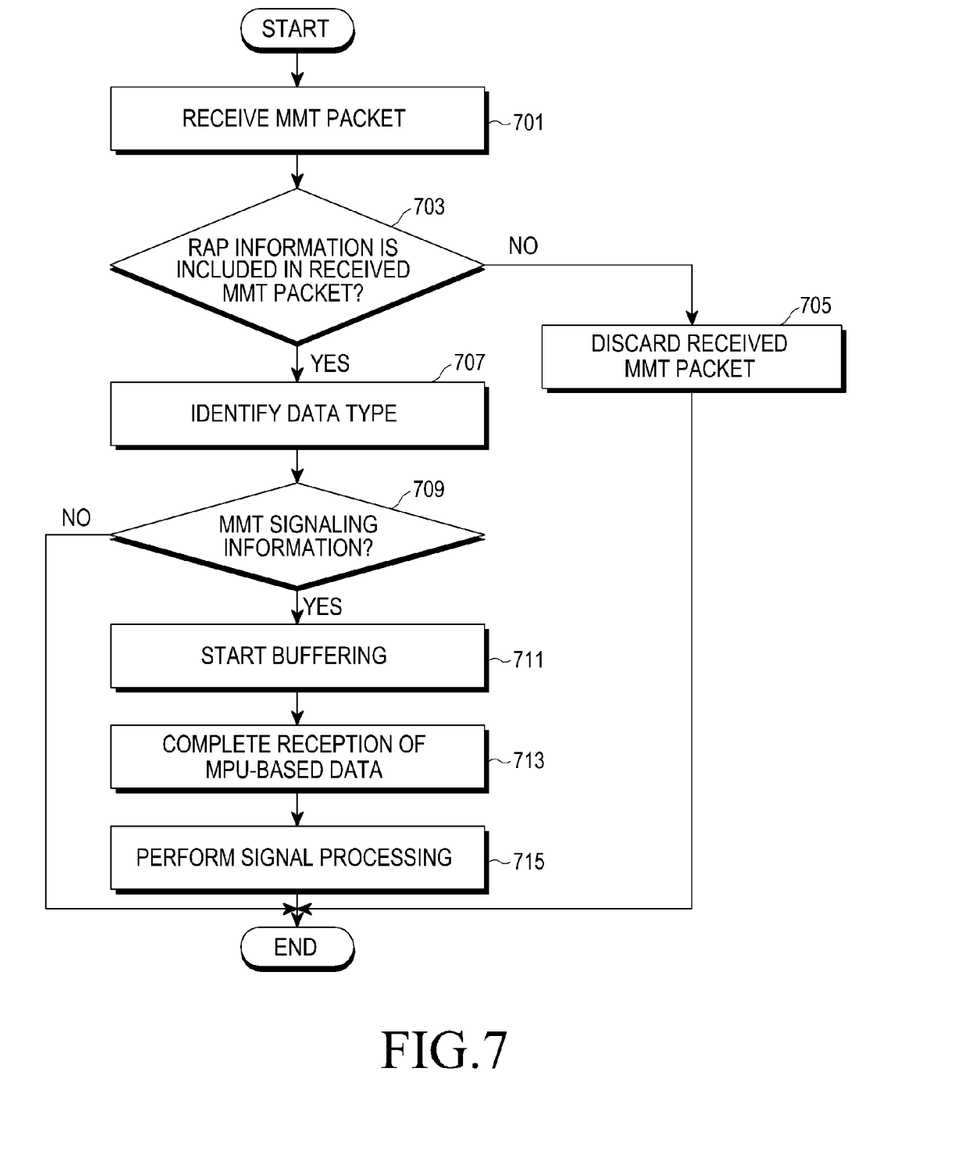
FIG. 7 is a flowchart illustrating an operation of receiving an MMTP packet including MMT signaling information by a receiving entity according to an embodiment of the present disclosure.

FIG. 7 is a flowchart illustrating an operation of receiving an MMTP packet including MMT signaling information by a receiving entity according to an embodiment of the present disclosure. The MMT signaling information may include at least one of the signaling messages for managing delivery and consumption of media data.

Referring to FIG. 7, once receiving an MMTP packet in operation 701, the receiving entity identifies the "R" field (i.e., RAP flag information) of FIG. 5 from header information of the received MMTP packet and determines whether the RAP information is included in the received MMTP packet in operation 703. If determining that the RAP information is not included in the MMTP packet in operation 703, the receiving entity discards the received MMTP packet in operation 605. Although the MMTP packet that does not include the RAP information is described as being discarded in operation 705, the receiving entity may perform a general operation of receiving an MMTP packet that does not include the RAP information after completing reception of signaling information, etc. In another embodiment, when the receiving entity uses a limited memory or performs a low-energy process, all MMTP packets that do not include RAP information may be discarded in operation 705.

If determining that the RAP information is included in the MMTP packet in operation 703, the receiving entity identifies type information (the "type" field 503 of FIG. 5) of payload data included in header information of the MMTP packet in operation 707. If the type information of the payload data indicates the signaling information (e.g., if the "type" field has a value of "0x02") in operation 709, the receiving entity starts buffering from the received MMTP packet in operation 711 and completes MPU-based data reception in operation 713. The receiving entity performs signal (or data) processing by using the completely received signaling information in operation 715.

Figure 8:
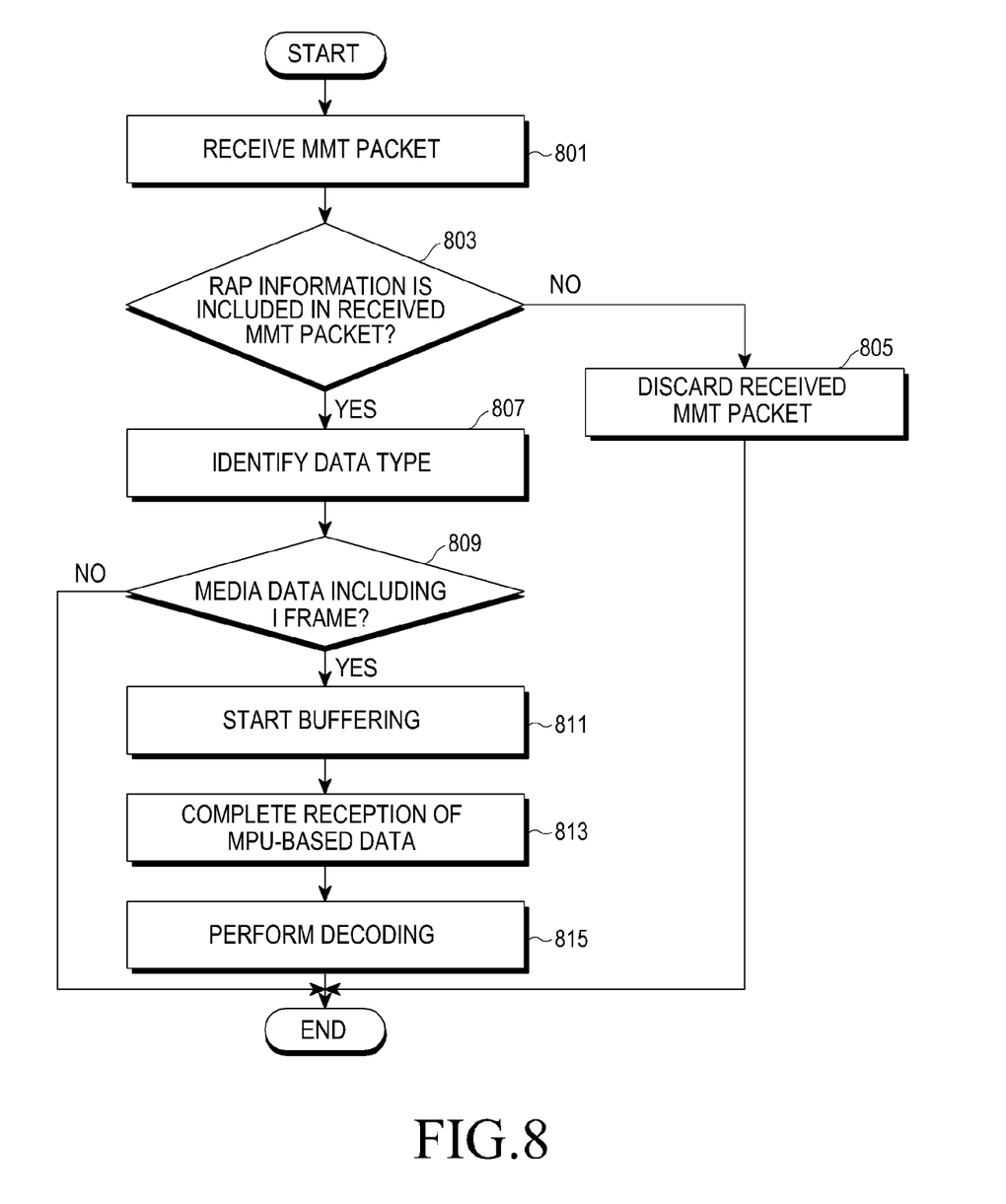
FIG. 8 is a flowchart illustrating an operation of receiving an MMTP packet including particular media data by a receiving entity according to an embodiment of the present disclosure.

FIG. 8 is a flowchart illustrating an operation of receiving an MMTP packet including particular media data by a receiving entity according to an embodiment of the present disclosure. The particular media data is assumed to be an I frame that may be encoded/deco P21991-US/DMCded without reference to another image frame.

Referring to FIG. 8, once receiving an MMTP packet in operation 801, the receiving entity identifies the "R" field (i.e., RAP flag information) of FIG. 5 from header information of the received MMTP packet and determines whether the RAP information is included in the received MMTP packet in operation 803. If determining that the RAP information is not included in the MMTP packet in operation 803, the receiving entity discards the received MMTP packet in operation 605. Although the MMTP packet that does not include the RAP information is described as being discarded in operation 805, the receiving entity may perform a general operation of receiving an MMTP packet that does not include the RAP information after completing reception of an I frame, etc. In another embodiment, when the receiving entity uses a limited memory or performs a low-energy process, all MMTP packets that do not include RAP information may be discarded in operation 805.

If determining that the RAP information is included in the MMTP packet in operation 803, the receiving entity identifies type information (the "type" field 503 of FIG. 5) of payload data included in header information of the MMTP packet in operation 807. If the type information of the payload data indicates the signaling information (e.g., if the "type" field has a value of "0x00" or "0x01") in operation 809, the receiving entity starts buffering from the received MMTP packet in operation 711 and completes MPU-based data reception in operation 713. The receiving entity performs decoding of image frames by using the completely received I frame in operation 715. In another embodiment, position information regarding multiple I frames may be carried in a payload of an MMTP packet, and the position information may be received through the RAP information to receive multiple I frames.

As such, if an I frame is received in advance by using RAP information, a reproduction delay caused by channel switch may be reduced largely in a broadcasting service where broadcast channel switch frequently occurs.

Figure 9:
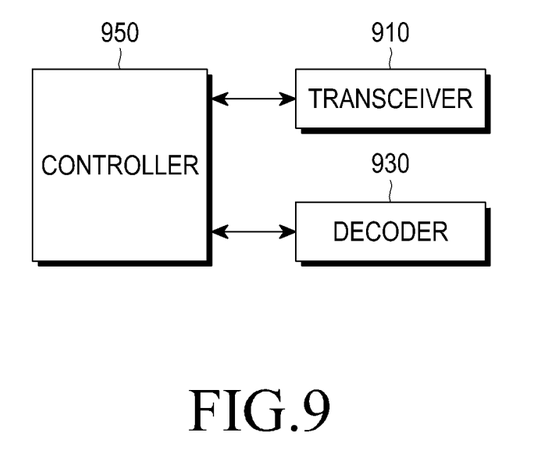
FIG. 9 is a block diagram of a receiving entity in a communication system according to an embodiment of the present disclosure.

FIG. 9 is a block diagram of a receiving entity in a communication system according to an embodiment of the present disclosure.

Referring to FIG. 9, a receiving entity may include a transceiver 910 for transmitting and receiving data over a wireless network, a decoder 930 for decoding received data, and a controller 950 for preferentially detecting and receiving at least one MMTP packet including particular media data (e.g., an I frame) or particular information (e.g., MPU metadata or signaling information) from among multiple MMTP packets transmitted after division and packetization of an MPU from a sending entity in a manner described with reference to FIGS. 2 through 8. In the current embodiment, the controller 950 determines whether a media packet received by the transceiver 910 includes access information for receiving at least one of particular media data and particular information, and preferentially receives at least one of the particular media data and the particular information by using the access information if determining that the received media packet includes the access information.

Although the embodiments of FIGS. 6 through 9 have been described as separate operations, two or more of them may be carried out in combination.

The embodiments of the present disclosure may be implemented with a computer-readable code on a computer-readable recording medium. The computer readable recording medium may be any type of data storage device that may store data readable by a computer system. Examples of record-mediums readable by the computer may include a Read-Only Memory (ROM), a Random-Access Memory (RAM), compact disk ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such arbitrary software may be stored, for example, in a volatile or non-volatile storage device (e.g., a ROM, etc.), a memory (e.g., a RAM, a memory chip, a memory device, or a memory IC), or a machine (e.g., computer) recordable optical or magnetic storage medium (e.g., a CD, a DVD, a magnetic disc, a magnetic tape, etc.) regardless of its ability to erase or rewrite. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Accordingly, the present invention includes a program that includes a code for implementing the apparatus and method set forth in the appended claims of the specification and a machine (computer, etc.) readable storage medium for storing the program. Furthermore, the program may be electronically transferred by an arbitrary medium, such as a communication signal transmitted through a wired or wireless connection, and the present invention appropriately includes equivalents of the program.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method for receiving a media packet in a multimedia system, the method comprising:
    receiving the media packet including a packet header and a payload, the packet header comprising a random access point (RAP) flag and the payload comprising a payload header and payload data;
    identifying if the RAP flag has a first value indicating that the payload comprises RAP information;
    decoding the payload included in the media packet if the RAP flag has the first value; and
    discarding the media packet if the RAP flag has a second value indicating that the media packet comprises no RAP information.

2. The method of claim 1, wherein the RAP information comprises start position information of a-media data access.

3. The method of claim 1, wherein the RAP information comprises at least one intra-coded (I) frame to be decoded without a related frame.

4. The method of claim 1, wherein the RAP information comprises metadata of a media processing unit with International Organization for Standardization (ISO) basic media file format (ISOBMFF).

5. The method of claim 1, wherein the RAP information comprises at least one signaling message for delivery and consumption of media data.

6. The method of claim 1, further comprising:
    identifying a fragment type field included in the payload header of the payload, if the RAP flag has the first value; and
    if the RAP flag has the first value and the fragment type field indicates metadata of a media processing unit, identifying that the RAP information comprises the metadata of the media processing unit with International Organization for Standardization (ISO) basic media file format (ISOBMFF).

7. The method of claim 1, further comprising:
    identifying a type field included in the packet header, if the RAP flag has the first value; and
    if the RAP flag has the first value and the type field indicates one or more signaling messages, identifying that the RAP information comprises at least one signaling message for delivery and consumption of media data.

8. The method of claim 1, further comprising:
    identifying a type field included in the packet header, if the RAP flag has the first value; and
    if the RAP flag has the first value and the type field indicates a fragment of a media processing unit or a complete media processing unit, identifying that the RAP information comprises at least one intra-coded (I) frame to be decoded without a related frame.

9. An apparatus in a receiving entity for receiving a media packet in a multimedia system, the apparatus comprising:
    a transceiver configured to receiving the media packet including a packet header and a payload through a wireless network, the packet header comprising a random access point (RAP) flag and the payload comprising a payload header and payload data; and
    a controller configured to identify if the RAP flag has a first value indicating that the payload comprises RAP information, decoding the payload included in the media packet if the RAP flag has the first value, and discard the media packet, if the RAP flag has a second value indicating that the media packet comprises no RAP information.

10. The apparatus of claim 9, wherein the RAP information indicates start position information of media data access.

11. The apparatus of claim 9, wherein the RAP information comprises at least one intra-coded (I) frame to be decoded without a related frame.

12. The apparatus of claim 9, wherein the RAP information comprises metadata of a media processing unit with International Organization for Standardization (ISO) basic media file format (ISOBMFF).

13. The apparatus of claim 9, wherein the RAP information comprises at least one signaling message for delivery and consumption of media data.

14. The apparatus of claim 9, wherein the controller is further configured to identify a fragment type field included in the payload header of the payload, if the RAP flag has the first value, and, if the RAP flag has the first value and the fragment type field indicates metadata of a media processing unit, identify that the RAP information comprises the metadata of the media processing unit with International Organization for Standardization (ISO) basic media file format (ISOBMFF).

15. The apparatus of claim 9, wherein the controller is further configured to identify a type field included in the packet header, if the RAP flag has the first value, and, if the RAP flag has the first value and the type field indicates one or more signaling messages, identify that the RAP information comprises at least one signaling message for delivery and consumption of media data.

16. The apparatus of claim 9, wherein the controller is further configured to identify a type field included in the packet header, if the RAP flag has the first value, and, if the RAP flag has the first value and the type field indicates a fragment of a media processing unit or a complete media processing unit, identify that the RAP information comprises at least one intra-coded (I) frame to be decoded without a related image.

* * * * *